(12) United States Patent
Krivokon et al.

(10) Patent No.: US 11,645,852 B2
(45) Date of Patent: May 9, 2023

(54) TRAFFIC LIGHT DETECTION AND LANE STATE RECOGNITION FOR AUTONOMOUS VEHICLES

(71) Applicant: Waymo LLC, Mountain View, CA (US)

(72) Inventors: Maxim Krivokon, Palo Alto, CA (US); Abhijit S. Ogale, Sunnyvale, CA (US); Edward Hsiao, Mountain View, CA (US); Andreas Wendel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 153 days.

(21) Appl. No.: 17/336,856

(22) Filed: Jun. 2, 2021

(65) Prior Publication Data

US 2021/0343150 A1 Nov. 4, 2021

Related U.S. Application Data

(63) Continuation of application No. 16/169,080, filed on Oct. 24, 2018, now Pat. No. 11,056,005.

(51) Int. Cl.
*G08G 1/16* (2006.01)
*G05D 1/00* (2006.01)
(Continued)

(52) U.S. Cl.
CPC ........... *G08G 1/167* (2013.01); *G05D 1/0088* (2013.01); *G06V 20/584* (2022.01);
(Continued)

(58) Field of Classification Search
None
See application file for complete search history.

(56) References Cited

U.S. PATENT DOCUMENTS 6,704,619 B1 3/2004 Coleman et al.
9,170,116 B1 10/2015 Joshi et al.
(Continued)

FOREIGN PATENT DOCUMENTS

CN 102034348 A 4/2011
CN 106980657 A 7/2017
(Continued)

OTHER PUBLICATIONS

First Office Action for Chinese Application No. 201980077196.5 dated Jan. 20, 2022, (18 Pages).
(Continued)

*Primary Examiner* — Daniel L Greene
(74) *Attorney, Agent, or Firm* — Botos Churchill IP Law

(57) ABSTRACT

Methods and system are provided for training and using a model to determine states of lanes of interest. For instance, image data including an image and an associated label identifying at least one traffic light, a state of the at least one traffic light, and a lane controlled by the at least one traffic light are received and used to train the model such that the model is configured to, in response to receiving an image and a lane of interest included in the image, output a lane state for the lane of interest. This model is then used by a vehicle in order to determine a state of a lane of interest. This state is then used to control the vehicle in an autonomous driving mode based on the state of the lane of interest.

14 Claims, 13 Drawing Sheets

(51) Int. Cl.
    *G06V 20/58*     (2022.01)
    *G06V 30/194*    (2022.01)
    *G08G 1/01*      (2006.01)
    *G08G 1/04*      (2006.01)
    *G08G 1/095*     (2006.01)
    *G06V 20/56*     (2022.01)

(52) U.S. Cl.
    CPC .......... *G06V 20/588* (2022.01); *G06V 30/194* (2022.01); *G08G 1/0129* (2013.01); *G08G 1/0145* (2013.01); *G08G 1/04* (2013.01); *G08G 1/095* (2013.01); *G08G 1/166* (2013.01)

(56) References Cited

U.S. PATENT DOCUMENTS

| | | | |
|---|---|---|---|
| 10,220,769 | B1* | 3/2019 | Dellock ............ G08G 1/096783 |
| 2010/0304640 | A1 | 12/2010 | Sofman et al. |
| 2012/0173043 | A1 | 7/2012 | Kobashi et al. |
| 2014/0195138 | A1 | 7/2014 | Stelzig et al. |
| 2014/0355879 | A1 | 12/2014 | Agosta et al. |
| 2016/0003636 | A1 | 1/2016 | Ng-Thow-Hing et al. |
| 2017/0286782 | A1 | 10/2017 | Pillai et al. |
| 2018/0047147 | A1 | 2/2018 | Viswanathan |
| 2018/0144203 | A1 | 5/2018 | Moosaei et al. |
| 2018/0170375 | A1 | 6/2018 | Jang et al. |
| 2018/0190111 | A1 | 7/2018 | Green et al. |
| 2018/0211120 | A1 | 7/2018 | Smith et al. |
| 2018/0297470 | A1* | 10/2018 | Kim ...................... B60Q 1/085 |
| 2019/0035101 | A1 | 1/2019 | Kwant et al. |
| 2019/0317509 | A1 | 10/2019 | Zhang et al. |

FOREIGN PATENT DOCUMENTS

| | | |
|---|---|---|
| CN | 107992829 A | 5/2018 |
| JP | 2010224925 A | 10/2010 |
| JP | 2013143043 A | 7/2013 |
| JP | 2014235737 A | 12/2014 |
| JP | 2017030396 A | 2/2017 |
| JP | 2018060563 A | 4/2018 |
| WO | 2019222358 A1 | 11/2019 |

OTHER PUBLICATIONS

International Search Report and Written Opinion for application No. PCT/US2019/056941 dated Feb. 3, 2020, 15 Pages.

"Partial International Search Report received for PCT Patent Application No. PCT/US2019/056941, dated Dec. 10, 2019", 10 pages.

Jun Li, et al., "1 Deep Neural Network for Structural Prediction and Lane Detection in Traffic Scene", IEEE, Transactions on Neural Networks and Learning Systems, vol. 28, No. 3, Piscat., NJ, USA, Mar. 1, 2017, pp. 690-703.

Zhou Xing, et al., "Predictions of Short-term Driving Intention Using Recurrent Neural Network on Sequential Data", arxiv.org, Cor. Univ. Lib., 201 Olin Lib. Cornell Univ. Ithaca, NY, 2. Desc. of the Sim. Envir. and Data Format 4. Our Predic. Mod., Mar. 28, 2018, 6 pages.

Notice of Reasons for Rejection for Japanese Patent Application No. 2021-519126, dated Apr. 25, 2022, (24 Pages).

* cited by examiner

1200

TRAFFIC LIGHT DETECTION AND LANE STATE RECOGNITION FOR AUTONOMOUS VEHICLES

CROSS REFERENCE TO RELATED APPLICATIONS

The present application is a continuation of U.S. patent application Ser. No. 16/169,080, filed Oct. 24, 2018, now U.S. Pat. No. 11,056,005, the entire disclosure of which is incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, heading, acceleration or deceleration, type, etc. This information is critical to allowing the vehicle's computing systems to make appropriate driving decisions for the vehicle.

BRIEF SUMMARY

Aspects of the disclosure provide a method of training a model for determining states of lanes of interest. The method includes receiving, by one or more server computing devices, image data including an image and an associated label identifying at least one traffic light, a state of the at least one traffic light, and a lane controlled by the at least one traffic light; and training, by the one or more server computing devices, the model using the image data such that the model is configured to, in response to receiving an image and a lane of interest included in the image, output a lane state for the lane of interest.

In one example, the method further comprises, prior to the training, projecting a road segment corresponding to the lane into the image. In another example, the method further comprises, prior to the training, generating a second image using the image and the projection, the second image highlighting an area of the projection in the image, and wherein training the model is further based on the second image. In another example, the method also includes generating the associated label by projecting a three-dimensional location of the at least one traffic light into the image. In this example, the method also includes determining the state by processing the image to identify a blob of color within an area of the projection. In another example, the lane state identifies whether a vehicle in that lane is required to go, stop, or use caution. In another example, the method also includes, training the model to identify stop lines in images relevant to the lane of interest. In this example, the training further includes using a label identifying a location of a stop line in the image. In another example, the image data further includes a second image and a second associated label identifying the at least one traffic light, a second state of the at least one traffic light in the second image, the second state being different from the state of the at least one traffic light such that the training includes using images of the at least one traffic light captured at different times in different states.

Another aspect of the disclosure provides a method of using a model to determine states of lanes of interest. The method includes receiving, by one or more processors, an image generated by a perception system of a vehicle; identifying, by the one or more processors, a lane of interest; using, by the one or more processors, the image and the lane of interest as input into the model to output a state of the lane of interest according to a state of a traffic light in the image; and controlling, by the one or more processors, the vehicle in an autonomous driving mode based on the state of the lane of interest.

In one example, identifying the image with the lane of interest includes projecting a road segment corresponding to a lane in which the vehicle is currently driving into the image. In another example, the method also includes comparing the state of the lane of interest to a determined state of the traffic light in the image, and wherein controlling the vehicle is further based on the comparing. In this example, the lane state identifies whether a vehicle in that lane is required to go, stop, or use caution. In another example, the model further outputs a location of a stop line in the image that is relevant to the lane of interest, and controlling the vehicle is further based on the location of the stop line. In another example, the method also includes, prior to capturing the image, controlling the vehicle in the autonomous driving mode based on pre-stored map information, and the image is input into the model when the vehicle is located in an area that is not included in the map information. In another example, the method also includes, prior to capturing the image, controlling the vehicle in the autonomous driving mode based on pre-stored map information, and the image is input into the model when the vehicle is located in an area that is not up to date in the map information. In another example, the method also includes comparing the state of the lane with a state of the lane determined based on a state of a second traffic light, and wherein controlling the vehicle is further based on the comparing.

Another aspect of the disclosure provides a system for using a model to determine states of lanes of interest. The system includes one or more processors configured to receive an image generated by a perception system of a vehicle; identify a lane of interest; use the image and the lane of interest as input into the model to output a state of the lane of interest according to a state of a traffic light in the image; and control the vehicle in an autonomous driving mode based on the state of the lane of interest.

In one example, the one or more processors are further configured to label the image with the lane of interest includes by projecting a road segment corresponding to a lane in which the vehicle is currently driving into the image. In another example, the system also includes the vehicle.

DETAILED DESCRIPTION

Overview

Figure 1:
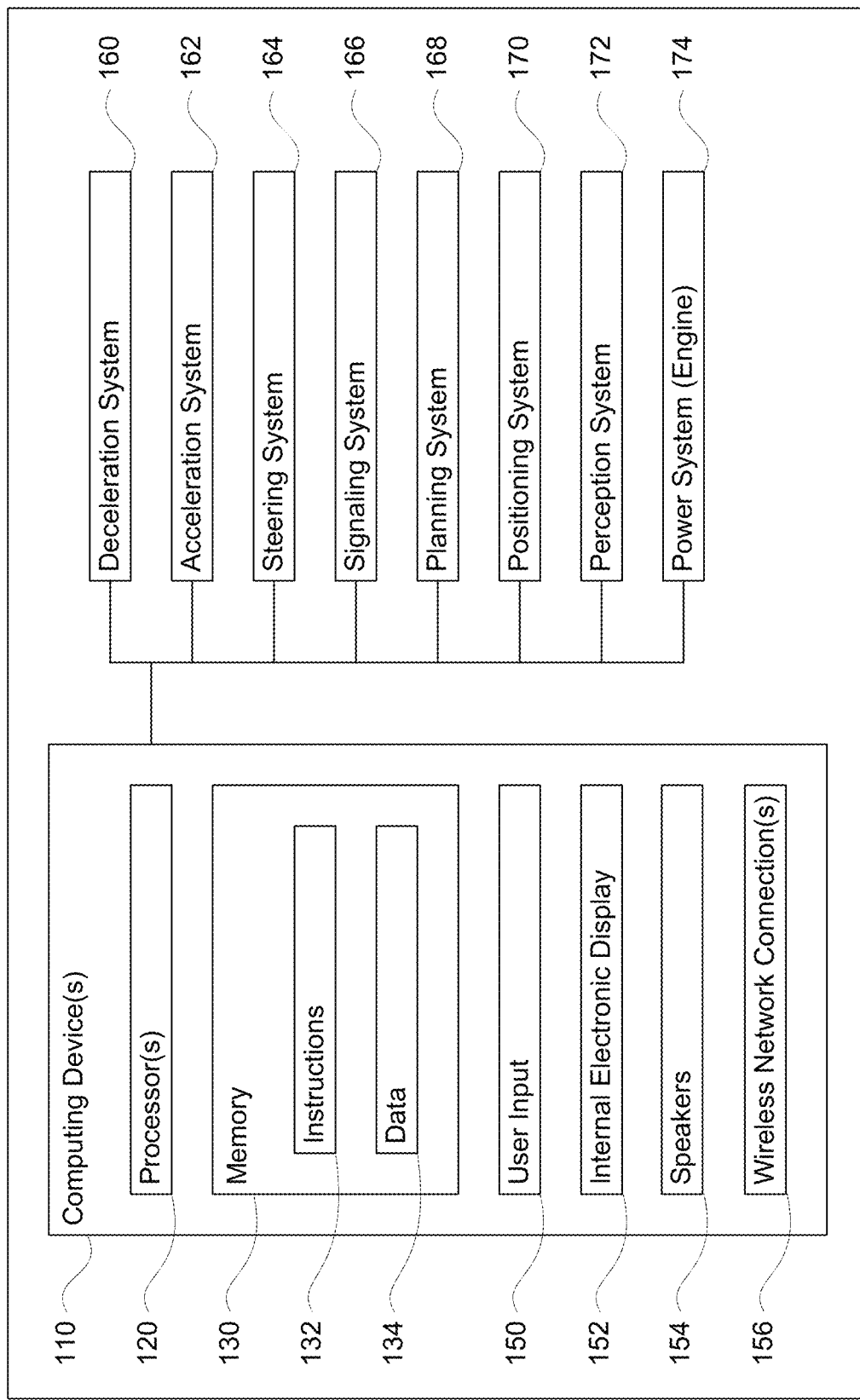
FIG. 1 is a functional diagram of an example vehicle in accordance with an exemplary embodiment.

The technology relates to detecting and responding to unmapped traffic lights for autonomous vehicles. While some image processing techniques may be used to detect the location and state (red, green, yellow, green arrow, flashing red, etc.) of a traffic light, an autonomous vehicle is unable to respond to the traffic light in a useful way without being able to determine what lane or lanes are controlled by the traffic light. Typically, such information is stored in a vehicle's map information (e.g. a roadgraph identifying lanes) and can be retrieved as needed to identify traffic lights and lane states. However, in some circumstances, such as where a traffic light is not included in the map information because the map information is incorrect or out of date, the vehicle may not actually be able to determine what lane is controlled by the traffic light and whether or not the vehicle should respond to the traffic light. As such, the vehicle may send a request for remote assistance to a human operator in order to be "told" what to do. In order to avoid this, a machine learning model may be trained using labeled camera images and map data to identify the location of traffic lights, the relationship of those traffic lights to specific lanes, as well as the states of those lanes.

The initial training data for the model may be generated in various ways. For instance, existing models or image processing techniques may be used to label images of traffic lights as well as the state of the traffic lights. The training data may also include lane information. For instance, the label for a given traffic light may be linked to a lane controlled by that traffic lights. Thus, the label for a given traffic light may be used to extrapolate a state for a lane controlled by that traffic light. In addition or alternatively, the model may be trained using labeled images of the same traffic light captured over time.

The trained model may then be used to assist a vehicle in detecting and responding to traffic lights. For instance, images captured by a camera of the vehicle's perception system may be input into the model along with a lane of interest (again, this is likely to be the lane in which the vehicle is currently driving). The output of the model may be used by the vehicle's computing devices in order to determine a state of a lane in which the vehicle is currently driving. The vehicle may then be controlled according to the state of the lane of interest. In other words, the output may be used to determine whether and how to respond to a traffic light. The model may also be used in order to confirm the operation of the vehicle's various systems.

The features described herein may allow an autonomous vehicle to detect and respond to traffic lights in real time without requiring those traffic lights to be previously identified, or rather, already stored in the vehicle's map information. This can be especially helpful in unmapped areas or in areas where the map is incorrect or not up to date.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planner system 168 may be used by computing device 110 in order to determine and follow a route to a location. In this regard, the planner system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2:
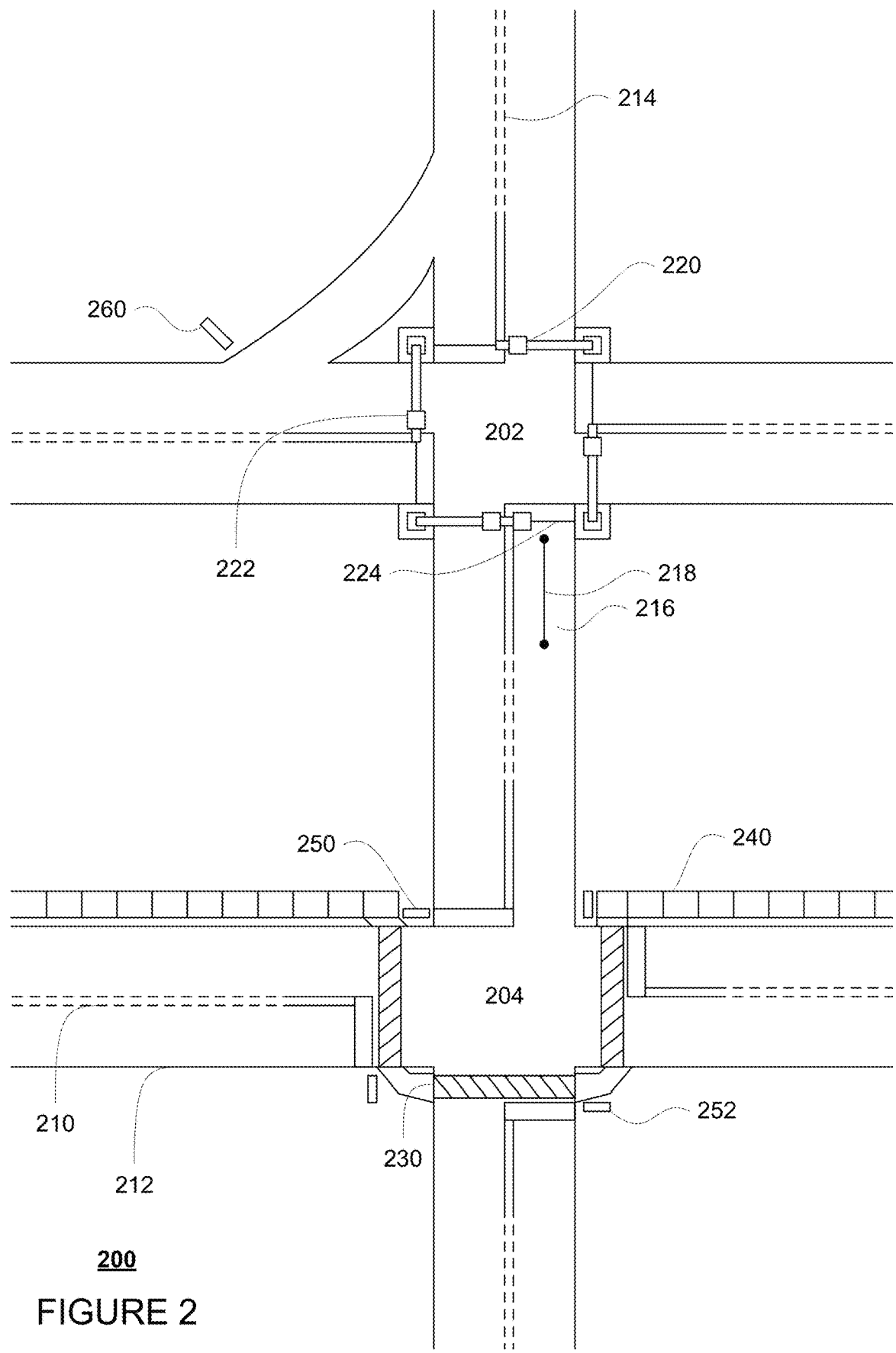
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, stop line 224, crosswalk 230, sidewalks 240, stop signs 250, 252, and yield sign 260. In this regard, the map information includes the three-dimensional (3D) locations of traffic lights 220, 222 as well as information identifying the lanes which are controlled by these traffic lights. For instance, traffic light 220 may be controlled by lane 216 corresponding to a road segment 218. For clarity and simplicity, only road segment 218 is depicted, though map information 200 may include road segments for all of the drivable areas of the map information. In other words, the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
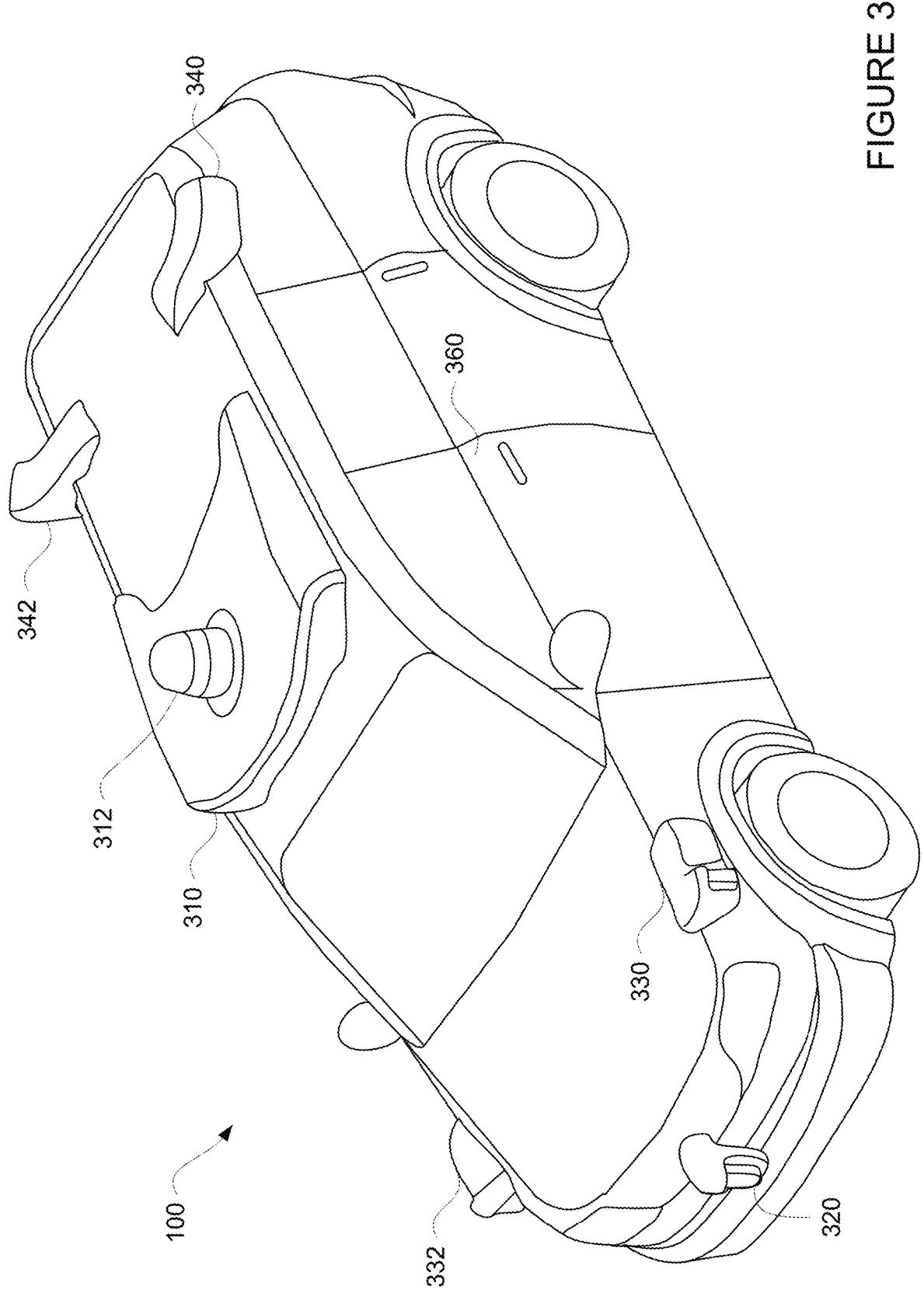
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing device 110 may control the vehicle by controlling various components. For instance, by way of example, computing device 110 may navigate the vehicle to a destination location completely autonomously using data from the detailed map information and planner system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
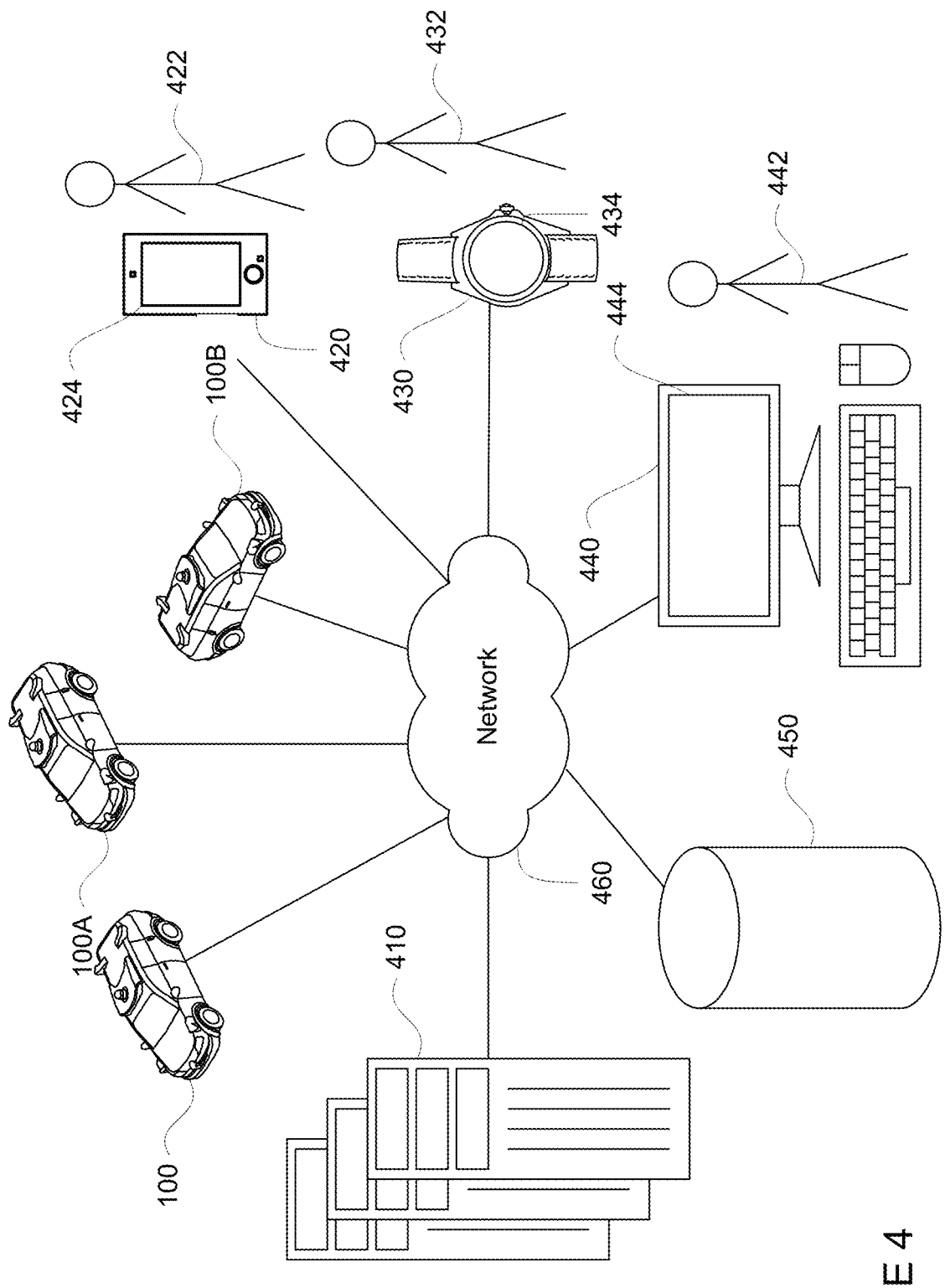
FIG. 4 is a pictorial diagram of an example system in accordance with aspects of the disclosure.
Figure 5:
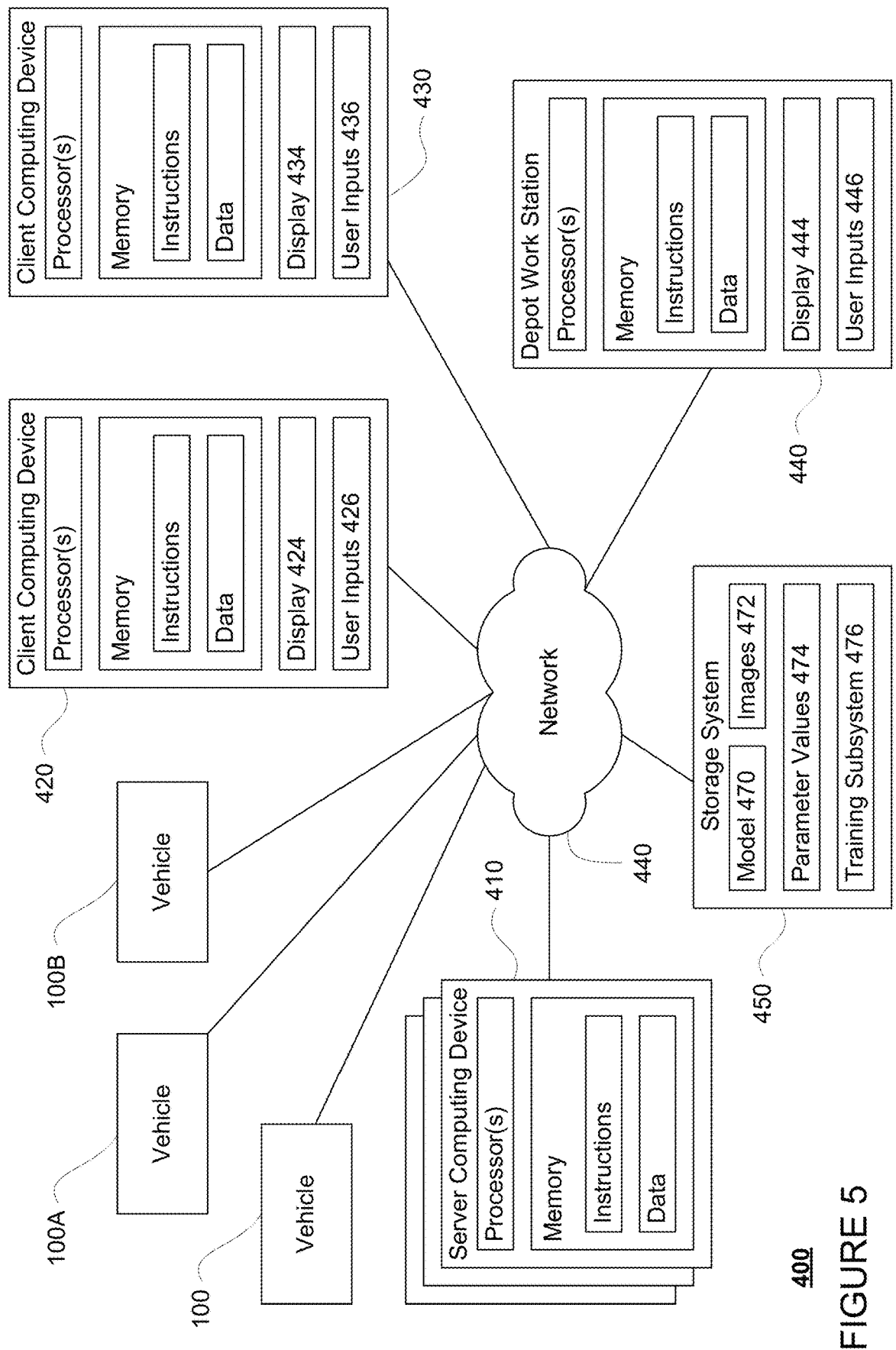
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the, in order to perform some or all of the features described herein. This information may be retrieved or otherwise accessed by a server computing device, such as one or more server computing devices 410, in order to perform some or all of the features described herein.

For instance, the storage system 450 may store sensor data captured by a vehicle's perception system, such as perception system 172 of vehicle 100. This sensor data may include a plurality of images 472. This plurality of images may include images captured by a perception system of an autonomous vehicle in order to provide the most relevant context and orientation of signs that may appear in those images. For instance, the plurality of images may be images or frames captured by still and/or video cameras or other sensors mounted on one or more vehicles such as vehicles 100 or 100A and uploaded via network 460 or otherwise sent to the storage system 450 for storage. Thus, the images may accurately reflect perception of the road and various objects from the perspective of the cameras or perception system of the vehicle. At least some of these images may be associated with labels and other information as discussed further below.

Each image may be associated with location information identifying the location and orientation from which the image was captured and/or more details information, such as geographic information for various surfaces within the image as determined from comparing with other images and/or from LIDAR sensor data captured by a LIDAR sensor of the perception system 172 contemporaneously with the image. For instance, the LIDAR sensor data may include data points corresponding to the locations and intensity (or reflectivity) of surfaces off of which light generated by the LIDAR sensor is reflected back to LIDAR sensor. This information may be used to determine the correspondences of those surfaces in the camera images.

The storage system 450 as well as data 132 of vehicle 100 may store one or more models 470 as well as model parameter values 474 for each such model. For instance, the storage system may store one or more models for determining states of lanes of interest. A model 470 may include a classifier such as a neural network, a deep neural network, decision tree, boosting tree, etc. In addition, the storage system 450 may include a training subsystem 476 that can be used to train a model as discussed further below.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to be able to use a model of the one or more models 470 to identify traffic lights, the model may first be trained "offline" that is, ahead of time and/or at a remote computing device and thereafter sent to the vehicle 100 via network 460 and wireless network connections 156. For instance, one or more of server computing devices 410 may generate the model parameter values 474 by first retrieving training data from the storage system 450.

Figure 6:
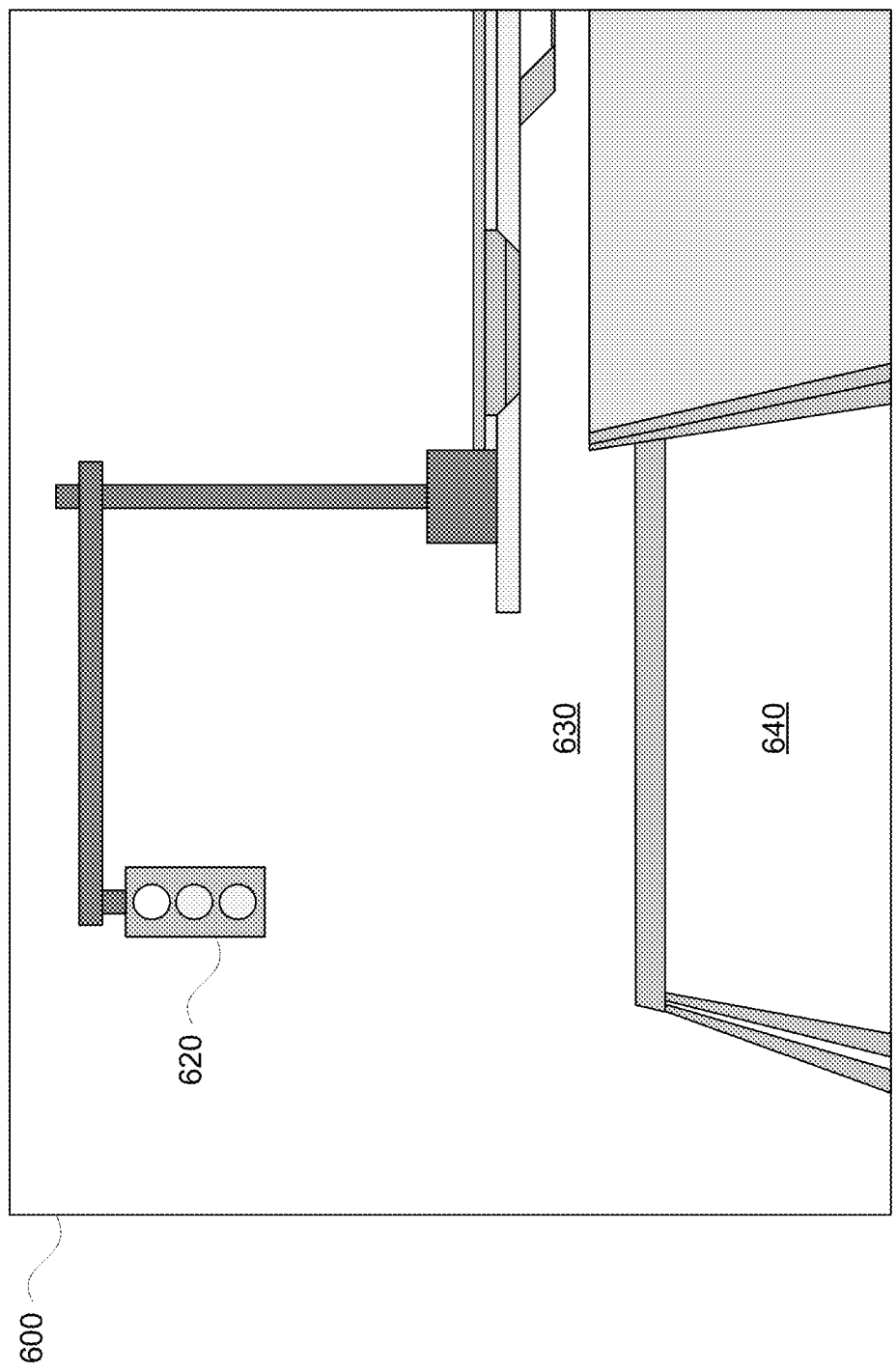
FIG. 6 is an example camera image in accordance with aspects of the disclosure.

For instance, the one or more server computing devices 410 may retrieve a set of images. As noted above, these images may include the plurality of images 472 of storage system 450 corresponding to locations where traffic lights are likely to be visible, such as images that are a predetermined distance from and oriented towards intersections of the map information that are controlled by traffic lights, such as intersection 202 of FIG. 2. For instance, images captured by cameras or other sensors mounted on vehicles, such as vehicle 100, where the cameras are within a certain distance of the traffic light and are oriented towards the traffic light may be retrieved and/or included in the set. In some examples, images that include partially occluded or completely occluded traffic lights may not be retrieved and/or included in the set. In other examples, images that include occluded traffic lights may be retrieved and included in a set to be used to determine or predict whether each image includes a partially or fully occluded traffic light, and whether a traffic light state can be determined from the partially occluded traffic light images. In some examples, predictions of whether occluded images include enough of a view of the traffic light to determine a traffic light state can be performed using model 470. In other examples, another model (not shown) may be used to provide output indicating occluded images with enough of a view of the traffic light to determine a traffic light state to be included in the set of images where traffic lights are likely to be visible. FIG. 6 is an example camera image 600 captured by a camera of perception system 172 of vehicle 100 as the vehicle approaches intersection 202 of the map information. In this example, traffic light 620 and part of an intersection 630 and a lane 640 are captured in camera image 600. This camera image may be processed and used to generate initial training data for the model.

Figure 7:
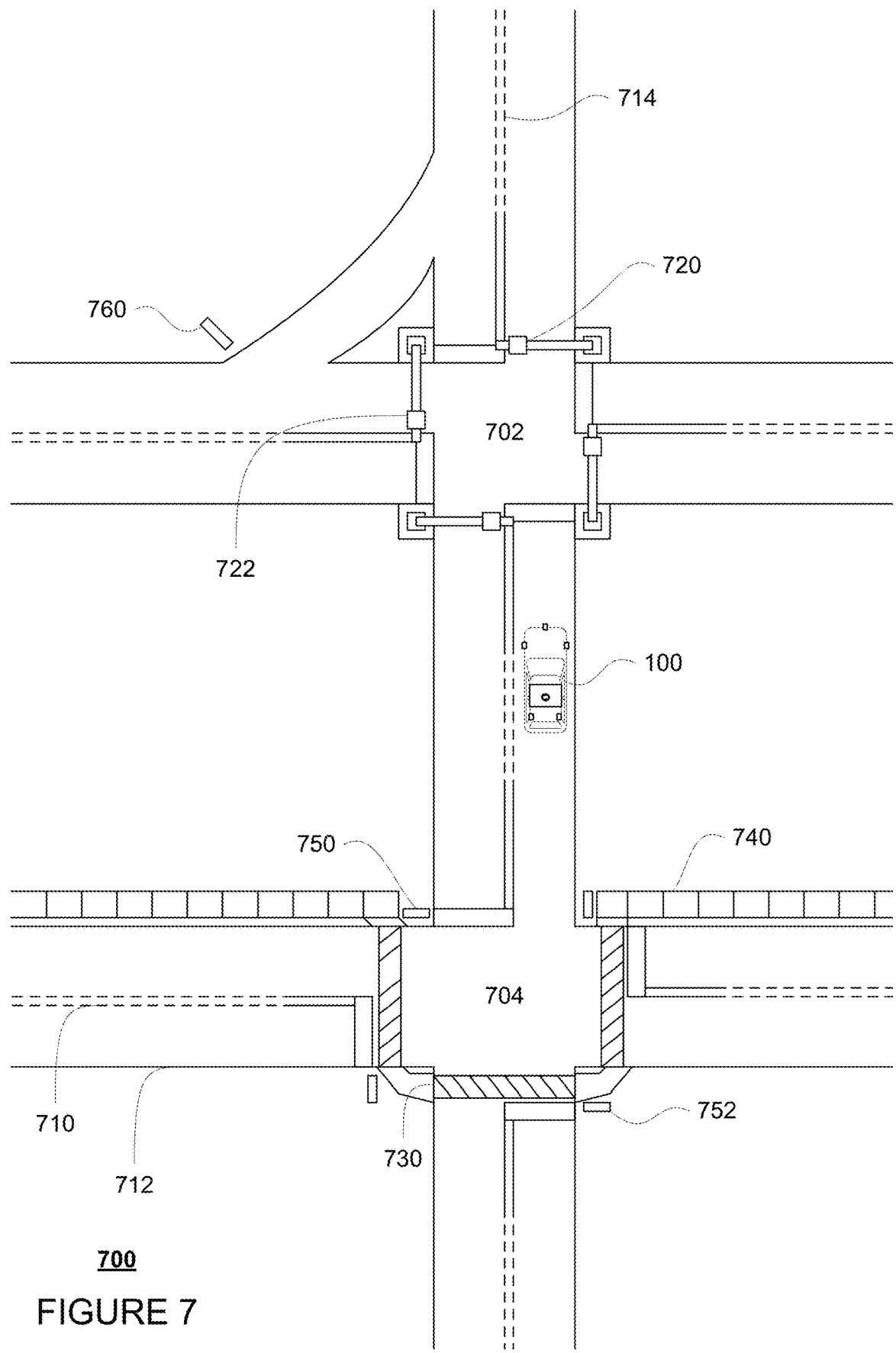
FIG. 7 is an example top-down view and corresponding portion of a LIDAR sensor frame in accordance with aspects of the disclosure.

As noted above, the images of the storage system may be associated with information identifying the location and orientation at which the image was captured. FIG. 7 depicts vehicle 100 being maneuvered on a section of roadway 700 including intersections 702 and 704. In example of FIG. 7, intersections 702 and 704 correspond to intersections 202 and 204 of the map information 200, respectively. In this example, lane lines 710, 712, and 714 correspond to the shape, location, and other characteristics of lane lines 210, 212, and 214, respectively. Similarly, crosswalk 730 corresponds to the shape, location, and other characteristics of crosswalk 230, respectively; sidewalks 740 correspond to sidewalks 240; traffic signal lights 720, 722 correspond to traffic signal lights 220, 222, respectively; stop signs 750, 752 correspond to stop signs 250, 252, respectively; and yield sign 760 corresponds to yield sign 260. Vehicle 100 is approaching intersection 702 at the location and orientation from which image 600 was captured. In this regard, image 600 may be retrieved from the storage system 450 and included in the set of images.

The initial training data for the model may be generated from the set of images in various ways. For instance, human operators may label images of traffic lights as well as the state of the traffic lights by reviewing the images, drawing bounding boxes around traffic lights, and identifying the state of the traffic light. In addition or alternatively, existing models or image processing techniques may be used to label images of traffic lights as well as the state of the traffic lights. As noted above, the vehicle 100 may utilize a traffic light detection system software module configured to detect the states of known traffic signals based on a priori locations, such as those identified in the map information 200. This software module may be used to detect the location of traffic lights and their states. For example, the three-dimensional locations of traffic lights identified in the map information may be projected into images captured by the vehicle's perception system.

Figure 8:
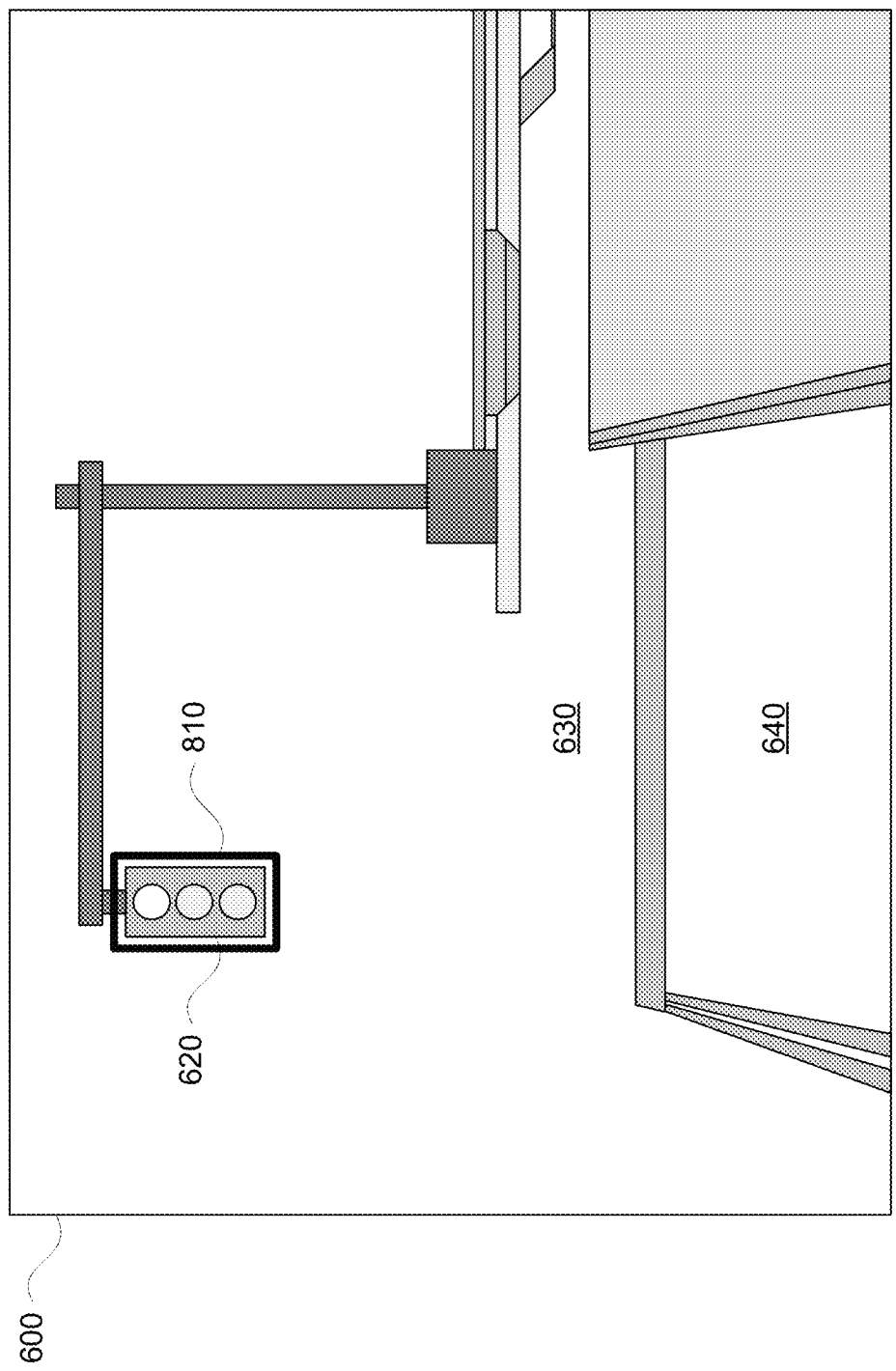
FIG. 8 is an example image and data in accordance with aspects of the disclosure.
Figure 9:
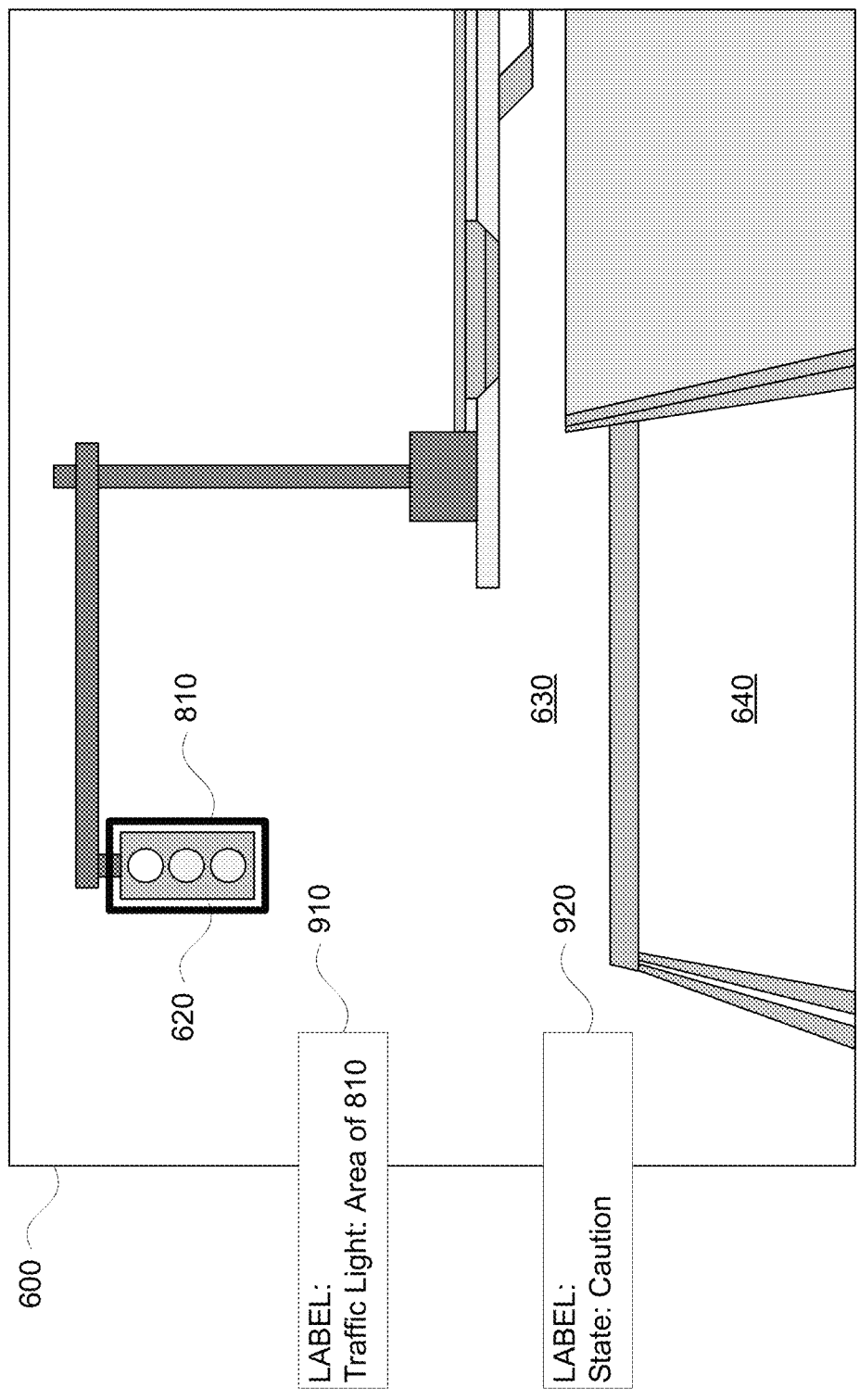
FIG. 9 is an example image and data in accordance with aspects of the disclosure.

For instance, the three-dimensional location of traffic light 220 may be projected into image 600 as shown in FIG. 8. The area of this projection 810 in the image may then be processed to determine the state of the traffic light in the image 600. Thus, turning to FIG. 9, a label 910 for image 600 may be generated including the three-dimensional location of the traffic light 220 (from the map information 200) and/or the two-dimensional location of the traffic light 620 (from the area of the projection 810).

The area of the projection may then be processed to identify colors and/or shapes (round green, arrow, green, etc.) in order to determine the state of the traffic light. This information may be used to generate a second label for the image identifying a state for a lane controlled by the traffic light. A lane controlled by a traffic light may have various states. For instance, a lane may have states such as "go" or "proceed" (green), "stop" (red), "stop" before proceeding ("flashing red:), "caution" or "yield" (yellow or flashing yellow), "arrow-go-left" (a variant of go for a left-hand turning lane), "arrow-go-right" (a variant of go for a right-hand turning lane), and so on. In this regard, returning to FIG. 9, a label 920 may include the state of the traffic light 620 as determined from the image 600.

Figure 10:
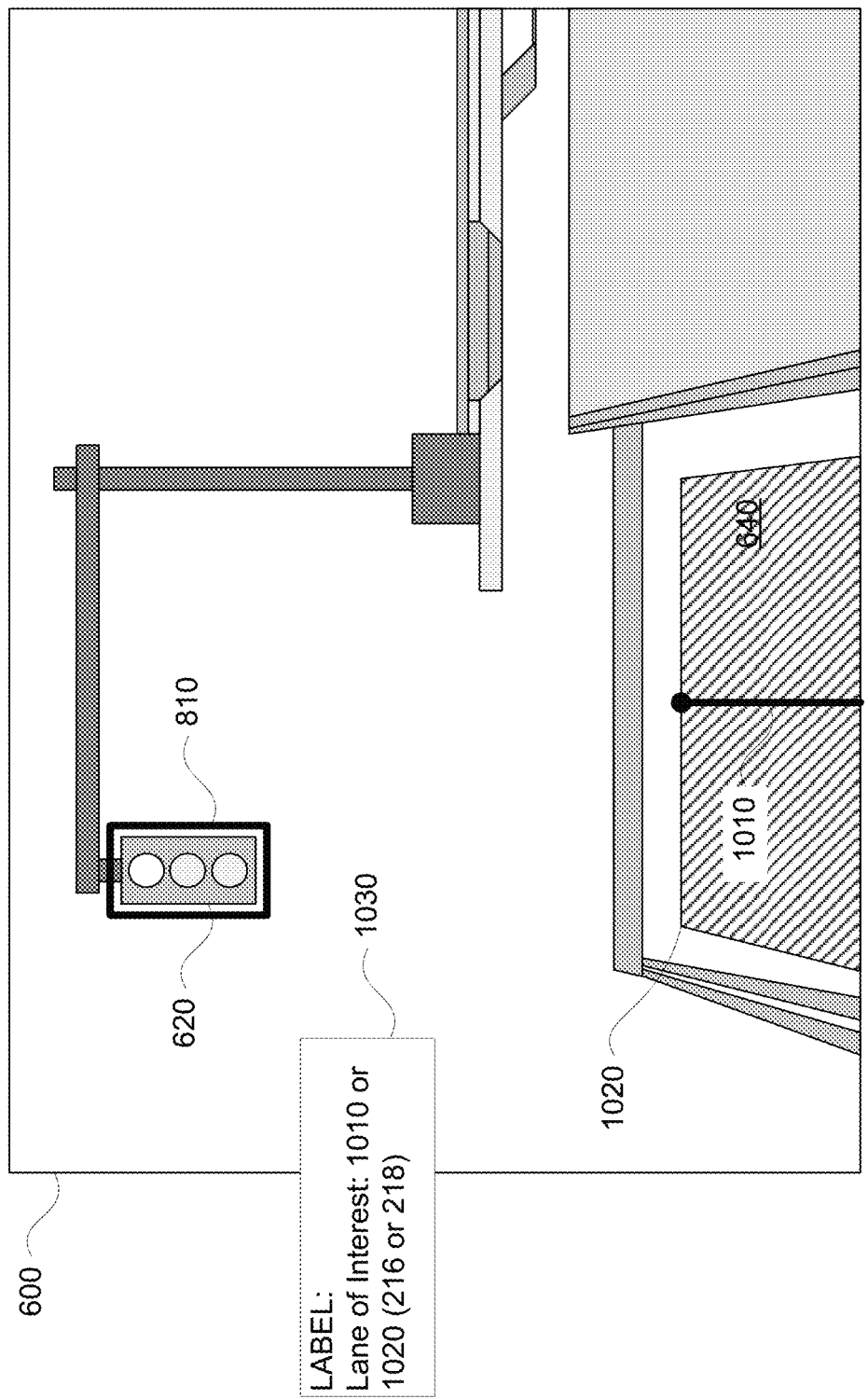
FIG. 10 is an example image and data in accordance with aspects of the disclosure.

The training data may also include lane information. For instance, the label identifying the two or three-dimensional location of a given traffic light may also identify a lane controlled by that traffic lights. This may be achieved by drawing or projecting the location of the lane, for instance the lane center, as provided in the map information that is controlled by a labeled traffic light in an image into that image. The projecting may be achieved using known three-dimensional transformations from three-dimensional world coordinates into the image coordinates. For instance, the map information 200 may identify that the traffic light 220 controls the road segment 218 corresponding to lane 216. Turning to FIG. 10, the area of this lane or the shape of the road segment may be projected into the image 600 to determine a line of a projection 1010 or an area of a second projection 1020. This projection, for instance either the line or the area, and in some instances the distance and direction from the traffic light 620 in the image, may then be used to generate a label 1030 for instance that colors or otherwise identifies the location of the lane of interest. As such, label 1030 identifies a lane of interest, here lane 640 and/or road segment 218.

Alternatively, rather than applying another label to the image, an additional image may be generated. For instance, the same image may be processed in order to highlight depict the lane, or rather, the area of the projection in one color, such as white, and the rest of the image in another color, such as black. Of course, there may be any number of different ways of identifying the lane of interest.

In this regard, given an image and a lane of interest (typically, the lane in which the vehicle is currently driving), the model may be trained to output the state of a lane as opposed to a state of a traffic light in the image. For instance, labeled images such as image 600 and labels 910, 920, and 1030, may be used to train the model or rather, to generate the model parameters 474. As an example, the images and labels identifying a lane of interest locations of traffic lights, such as image 600 and label 1030, may be provided as training input, and the labels identifying state of the lane and two or three-dimensional location of the traffic light and the relationship between the lane of interest and a traffic light, such as labels 910 and 920, may be provided as corresponding training output. In this regard, the model may be trained to also identify one or more traffic lights corresponding to the lane of interest as well as the relationship between that traffic light and the lane of interest. The more images and labels used to train the model, the more accurate the model parameters 274 may become. At the same time, the more images and labels used to train the model, the better at predicting the state of a lane of interest the model is likely to become.

In some instance, the model may be trained to identify both active and inactive elements and/or a configuration of a traffic light. For instance, the training data may identify which lights of the traffic signal may be lit and unlit and/or a number of elements (e.g. how many lights red, green, yellow, turning green, etc.) in the traffic light.

Figure 11:
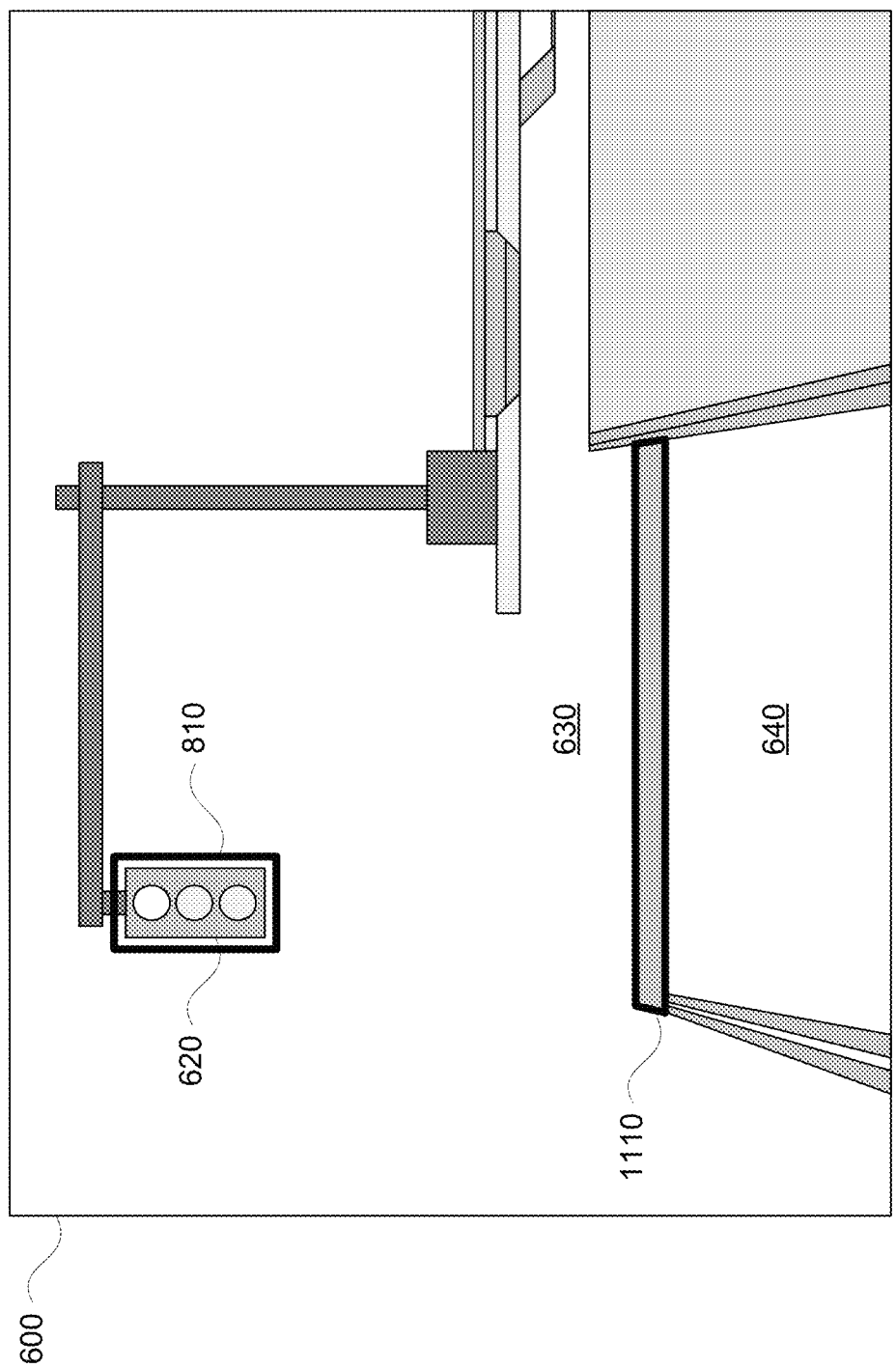
FIG. 11 is an example image and data in accordance with aspects of the disclosure.

In some instances, the model may also be trained to also identify a stop line as well as a distance to the stop line for the lane of interest. In other words, the images may be labeled with stop lines, again previously identified in the map information, projected into the images. For instance, turning to FIG. 11, image 600 may also be processed by projecting the location of stop line 224 into the image 600 as shown by the area of projection 1110. The area of this projection 1110, including its location, and in some cases the distance and direction from the traffic light 620 in the image, may then be used to generate another label which can be used as training output to train the model. As a result, the model may also be trained to provide the location and distance information for a stop line, providing the vehicle's computing devices with more information about how the vehicle should respond to the traffic light.

In addition or alternatively, the model may be trained using images of the same traffic light captured over time. In this regard, the model may be a recurrent neural network or a long short term memory neural network. For instance, over time, the state of the traffic light 720 would change and appear different in images captured at different times. This, as well as some heuristics about traffic light patterns, may also be used to determine or confirm a detected state of a traffic light (and lane). For instance, if a traffic light is green, the next color the traffic light could be would not be red. Thus, lane states may be determined such that temporal consistency between traffic light states is enforced. This may also help the model to provide information about the dynamic states of lights, such as flashing red or yellow lights.

Figure 12:
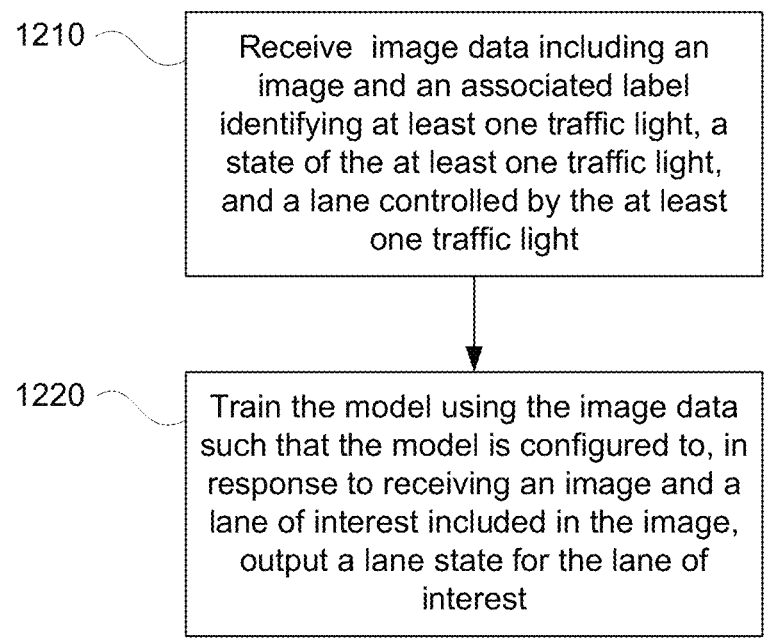
FIG. 12 is an example flow diagram in accordance with aspects of the disclosure.

FIG. 12 is an example flow diagram 1200 in accordance with aspects of the disclosure which may be performed by one or more processors of one or more computing devices, such as the processors of server computing devices 410, in order to train a model for identifying lane states of a lane of interest. For instance, at block 1210, image data including an image and an associated label identifying at least one traffic light, a state of the at least one traffic light, and a lane controlled by the at least one traffic light is received. As noted above, these labels may be generated in various ways. At block 1220, the model is trained using the image data such that the model is configured to, in response to receiving an image and a lane of interest included in the image, output a lane state for the lane of interest.

The model may then be provided to one or more vehicles in order to allow the computing devices of those vehicles to make better informed driving decisions. For instance, the model 470 and model parameter values 474 may be sent to the computing devices 110 of vehicle 100, for instance via network 460, or by otherwise loading this information into the computing devices 110. This information may then be stored in the memory 130 of the computing devices 110 in order to allow the computing devices to use the model to make driving decisions for the vehicle 100.

The trained model may then be used to assist a vehicle in detecting and responding to traffic lights. For instance, images captured by a camera of the vehicle's perception system, such as perception system 172 of vehicle 100, may be input into the model along with a lane of interest. This lane of interest may be identified by the computing devices 110 as input into the model, and may be the lane in which the vehicle is currently driving and/or a road segment which the vehicle will traverse at some point in the future. Thus, in some instances, the model may be trained to assume that lane of interest is always the lane in which the car currently is in and to predict the state of that lane based on just camera image without specifically requiring the designation of a lane of interest as input. In other instances, the lane of interest may be an adjacent lane (such as a turning lane), or a lane for opposing or cross traffic. This may assist the computing devices 110 in better responding to traffic in those lanes as well as better assessing the state of a lane in which the vehicle is currently driving. The lane of interest and the image may then be input into the model.

In some instances, the vehicle's computing devices, such as computing devices 110, may label the image with the lane of interest. To do so, the computing devices 110 generate a label identifying a lane of interest in the image, for instance using any of the techniques described above. Thus, the labeled image, or rather the image and the label, may be input into the model.

The output of the model may provide a state of the lane of interest and a corresponding traffic light in the image. This state may be used by the vehicle's computing devices 220 in order to determine a state of a lane in which the vehicle is currently driving. The vehicle may then be controlled in an autonomous driving mode (as discussed above) according to the state of the lane of interest. In this regard, the computing devices 110 may control the vehicle in order to go, stop, or proceed with caution. In other words, the output may be used to determine whether and how to respond to a traffic light.

The model may be used "full time" that is, to continuously detect the state of a lane from images in order to identify unmapped or lane states from mapped traffic lights as well. Alternatively, the model may be used as a backup system in unmapped or otherwise changed areas (areas that differ from the map information to a certain degree) in order to identify lane states. In other words, the image and the label are input the image is input into the model only when the vehicle is located in an area that is not included in the map information and/or only when the vehicle is located in an area that is not up to date in the local version of the map information. This may avoid the need to request assistance from a remote operator.

The model may also be used in order to confirm the operation of the vehicle's various systems. For instance, typically, there is more than one traffic light at an intersection. If a second traffic light is visible and connected to the same lane of interest, the state of the lane as determined from each of the traffic lights may be compared to ensure consistency. This may allow the vehicle to identify issues with its perception system and request assistance if needed.

Figure 13:
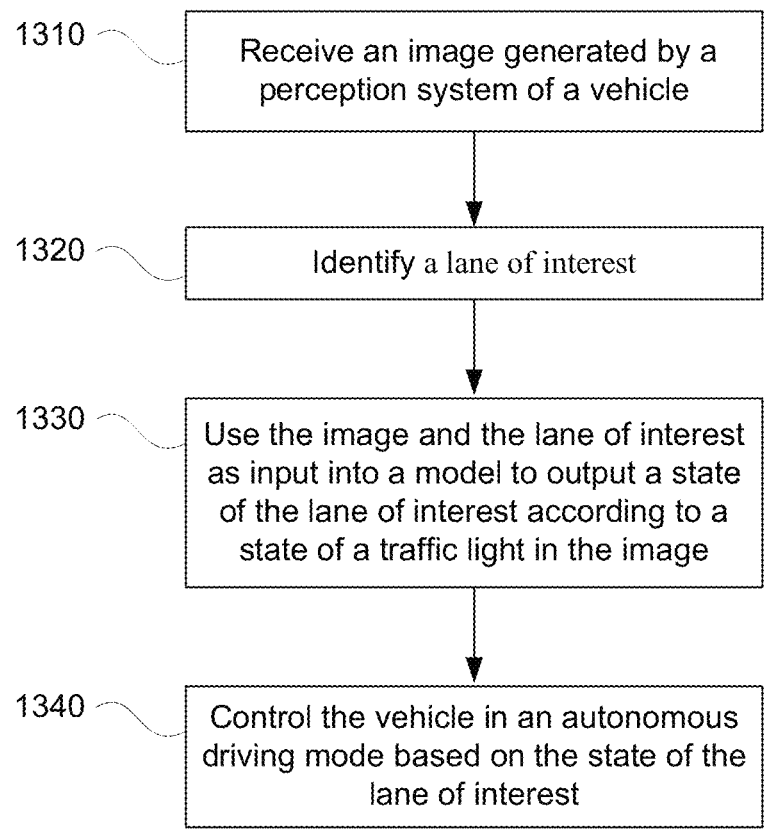
FIG. 13 is an example flow diagram in accordance with aspects of the disclosure.

FIG. 13 is an example flow diagram 1300 in accordance with aspects of the disclosure which may be performed by one or more processors of one or more computing devices, such as processors 120 of computing devices 110, in order to determine lane states of lanes of interest and control a vehicle, such as vehicle 100, in an autonomous driving mode. At block 1310, an image generated by a perception system of a vehicle is received. At block 1420, a lane of interest is identified. At block 1330, the image and the lane of interest are used as input into a model that outputs a state of the lane of interest according to a state of a traffic light in the image. At block 1340, the vehicle is controlled in an autonomous driving mode based on the state of the lane of interest.

The features described herein may allow an autonomous vehicle to detect and respond to traffic lights in real time without requiring those traffic lights to be previously identified, or rather, already stored in the vehicle's map information. This can be especially helpful in unmapped areas or in areas where the map is incorrect or not up to date.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of training a model for determining states of lanes of interest, the method comprising:
   receiving, by one or more server computing devices, image data including an image and an associated label identifying at least one traffic light, a state of the at least one traffic light, and a lane controlled by the at least one traffic light, the associated label generated by projecting a three-dimensional location of the at least one traffic light into the image; and
   training, by the one or more server computing devices, the model using the image data such that the model is configured to, in response to receiving an image and a lane of interest included in the image, output a lane state for the lane of interest.

2. The method of claim 1, further comprising, prior to the training, generating a second image using the image and the projection, the second image highlighting an area of the projection in the image, and wherein training the model is further based on the second image.

3. The method of claim 1, further comprising, determining the state of the at least one traffic light by processing the image to identify a blob of color within an area of the projection.

4. The method of claim 1, wherein the lane state identifies whether a vehicle in that lane is required to go, stop, or use caution.

5. The method of claim 1, further comprising, training the model to identify stop lines in images relevant to the lane of interest.

6. The method of claim 5, wherein the training further includes using a label identifying a location of a stop line in the image.

7. The method of claim 1, wherein the image data further includes a second image and a second associated label identifying the at least one traffic light, a second state of the at least one traffic light in the second image, the second state being different from the state of the at least one traffic light such that the training includes using images of the at least one traffic light captured at different times in different states.

8. The method of claim 1, further comprising, training the model to identify active and inactive elements of the at least one traffic light.

9. The method of claim 8, wherein the identifying includes whether the at least one traffic right is lit or unlit.

10. The method of claim 8, wherein the identifying includes determining a number of elements in the at least one traffic light.

11. The method of claim 1, further comprising, training the model using images of the at least one traffic light captured during a period of time.

12. The method of claim 11, wherein the model is a recurrent neural network or a long short term memory neural network.

13. The method of claim 3, wherein the state of the at least one traffic light is further determined by heuristics about traffic light patterns.

14. The method of claim 1, wherein identifying the lane controlled by the at least one traffic light is achieved by projecting a location of the lane controlled by the labeled at least one traffic light into the image.

* * * * *